United States Patent [19]

Laas et al.

[11] Patent Number: 5,621,064
[45] Date of Patent: Apr. 15, 1997

[54] URETDIONE POWDER COATING CROSS-LINKING AGENTS HAVING A LOW MELT VISCOSITY

[75] Inventors: Hans-Josef Laas, Köln; Reinhard Halpaap, Odenthal; Hans-Ulrich Meier-Westhues, Leverkusen; Wolfgang Schultz, Krefeld, all of Germany

[73] Assignee: Bayer Aktiengesellschaft, Leverkusen, Germany

[21] Appl. No.: 556,549

[22] Filed: Nov. 29, 1995

Related U.S. Application Data

[63] Continuation of Ser. No. 286,088, Aug. 4, 1994, abandoned.

[30] Foreign Application Priority Data

Aug. 17, 1993 [DE] Germany ............................ 43 27 573.7

[51] Int. Cl.⁶ ...................................................... C08G 18/10
[52] U.S. Cl. ............................ 528/60; 528/45; 528/65; 528/66; 528/73; 525/440
[58] Field of Search ........................... 252/182.2, 182.21, 252/182.22; 528/45, 60, 66, 65, 73; 540/202; 525/440

[56] References Cited

U.S. PATENT DOCUMENTS

| | | | |
|---|---|---|---|
| 3,857,818 | 12/1974 | Frizelle | 260/77.5 TB |
| 3,923,743 | 12/1975 | Quiring | 525/440 |
| 4,044,171 | 8/1977 | Muller et al. | 427/27 |
| 4,375,539 | 3/1983 | McBride et al. | 528/288 |
| 4,413,079 | 11/1983 | Disteldorf et al. | 524/169 |
| 4,463,154 | 7/1984 | Disteldorf et al. | 528/45 |
| 4,483,798 | 11/1984 | Disteldorf et al. | 260/239 A |
| 5,185,422 | 2/1993 | Drouve et al. | 528/76 |

FOREIGN PATENT DOCUMENTS 431331  6/1991  European Pat. Off. .

*Primary Examiner*—Rachel Gorr
*Attorney, Agent, or Firm*—Joseph C. Gil; Thomas W. Rov

[57] ABSTRACT

The present invention relates to polyaddition compounds that are solid below 40° C. and liquid above 125° C. and contain, based on the weight of the polyaddition compounds, a) 0 to 2% by weight of free isocyanate groups (calculated as NCO; molecular weight=42), b) 3 to 16% by weight of uretdione groups (calculated as $C_2N_2O_2$; molecular weight=84), c) 10 to 22% by weight of urethane groups (calculated as —NH—CO—O—; molecular weight=59).

d) 0 to 20% by weight of carboxylic add ester groups (calculated as CO—O—; molecular weight=44) and e) of 0 to 25% by weight of carbonate groups (calculated as —O—CO—O—; molecular weight=60), provided that the total content of carboxylic add ester groups and carbonate groups is at least 1% by weight.

The present invention also relates to a process for the preparation of these polyaddition compounds and to their use as a starting component for the manufacture of polyurethane plastics, especially as the cross-linking component in thermally cross-linkable two-component polyurethane powder coatings for heat-resistant substrates.

2 Claims, No Drawings

URETDIONE POWDER COATING CROSS-LINKING AGENTS HAVING A LOW MELT VISCOSITY

This application is a continuation of application Ser. No. 08/286,088 filed Aug. 4, 1994, now abandoned.

BACKGROUND OF THE INVENTION

1. Field of the Invention

The present invention relates to uretdione-group-containing polyaddition compounds, to a process for the their preparation and to their use in the manufacture of polyurethane plastics, especially cross-linking agents for thermally cross-linkable powder coatings.

2. Description of the Prior Art

Compositions of organic polyhydroxy compounds and blocked polyisocyanates, which are solid at room temperature, are valuable binding agents for thermally cross-linkable powder coatings (see, for example, DE-OS 2,105,777, DE-OS 2,542,191, DE-OS 3,143,060, DE-OS 2,735,497, DE-OS 2,842,641, EP-A 286,799, EP-A 218,040, EP-A 460,963, DE-OS 2,801,126, EP-A 403,779, WO 91/15532, U.S. Pat. Nos. 3,857,818, 4,375,539, EP-A 409,745, DE-OS 2,812,252, DE-OS 2,946,085 and DE-OS 3,434,881).

Common to the systems of those prior publications is the disadvantage that, during thermal cross-linking, the compounds used as blocking agents are split off and escape into the environment. Therefore, when they are being processed special precautions must be taken to purify the waste air and/or to recover the blocking agent for reasons of ecology and work hygiene.

An attempt to eliminate that fundamental disadvantage can be seen in the use of blocking-agent-free, uretdione-group-containing polyurethane (PUR) powder coating hardeners, in which cross-linking takes place with thermal re-cleaving of the uretdione groups.

The preparation of such powder coating cross-linking agents is known in principle. For example, DE-OS 2,420,475 describes reaction products of uretdione-group-containing polyisocyanates or polyisocyanate mixtures and difunctional and, optionally, monofunctional aliphatic or cycloaliphatic compounds, carrying groups that are reactive towards isocyanates, as blocking-agent-free cross-linking agents for PUR stoving systems. Solid products that are suitable as powder coating hardeners and have melting points in the range of from 140° to 260° C. are formed especially when uretdione-group-containing polyisocyanates based on aromatic diisocyanates, such as toluylene diisocyanate (TDI), are reacted with simple diols optionally containing ether groups.

Since cleaving of the uretdione ring in the presence of hydroxy-functional reactants is initiated at temperatures as low as approximately 110° C., the described polyaddition products suitable as powder coating cross-linking agents cannot be prepared in the melt but only dissolved in solvents that are inert towards isocyanates, which then necessitates an additional process step in order to separate the auxiliary solvent.

Uretdione group-containing powder coating cross-linking agents prepared from linear, difunctional IPDI uretdione, simple diols optionally containing ether oxygen, and, optionally, terminal monoamines or monoalcohols are the subject of EP-A-0,045,994, EP-A-O,045,996 and EP-A0, 045,998. In the preparation of these polyaddition products the reaction temperature also must not exceed 110° C. because otherwise cleaving of the uretdione groups is initiated. When a high degree of chain lengthening is necessary to obtain a high uretdione functionality of the cross-linking agent and also a high cross-linking density (i.e., when at least 70% of the NCO groups of the difunctional IPDI uretdiones are reacted with diols) the resulting chain-lengthened products have melting points in the range of the cleaving temperature or higher. Therefore, such polyaddition compounds can only be prepared in a reliable and reproducible manner in solution with a subsequent evaporation step.

The IPDI uretdione powder coating hardeners, described in the preceding publications, have melting points in the region of approximately 80° C., which are clearly below the cleaving temperature. However, these products still have such high melt viscosities at the maximum permissible reaction temperature of 110° C. that their ability to be produced in the melt on an industrial scale is limited due to the fact that they cannot be stiffed to a sufficiently high degree.

In addition, powder coatings prepared using the known uretdione group-containing powder coating hardeners of the prior art generally exhibit only moderate optical properties, especially insufficient flow, due to the high melt viscosity of such compounds.

An object of the present invention is to provide uretdione group-containing PUR powder coating cross-linking agents that do not have the described disadvantages of the polyaddition products of the prior art.

This object may be achieved with the polyaddition compounds according to the invention described in more detail hereinafter and the process for their preparation. These polyaddition compounds are based on the surprising observation that uretdione group-containing polyaddition compounds containing ester and/or carbonate groups have such low melt viscosities, even at temperatures only slightly above their melting point, that they can be prepared without difficulty in the melt and can be used to obtain powder coatings that are distinguished by excellent flow and a very high degree of gloss. An especially surprising fact is that when these uretdione group-containing polyaddition compounds are used as hardener component in PUR powder coatings, they harden to form fully cross-linked coatings at much lower stoving temperatures than do the corresponding polyaddition compounds of the prior art which do not contain ester and carbonate groups.

SUMMARY OF THE INVENTION

The present invention relates to polyaddition compounds that are solid below 40° C. and liquid above 125° C. and contain, based on the weight of the polyaddition compounds, a) 0 to 2% by weight of free isocyanate groups (calculated as NCO; molecular weight =42), b) 3 to 16% by weight of uretdione groups (calculated as $C_2N_2O_2$; molecular weight=84), c) 10 to 22% by weight of urethane groups (calculated as —NH—CO—O—; molecular weight=59), d) 0 to 20% by weight of carboxylic add ester groups (calculated as —CO—O—; molecular weight=44) and e) of 0 to 25% by weight of carbonate groups (calculated as —O—CO—O—; molecular weight=60), provided that the total content of carboxylic add ester groups and carbonate groups is at least 1% by weight.

The present invention also relates to a process for the preparation of these polyaddition compounds by reacting at an equivalent ratio of isocyanate groups to isocyanate-reactive groups of 1.2: 1 to 0.6:1, A) uretdione group-containing polyisocyanates having an average isocyanate functionality of at least 2.0 and B) up to 70% by weight, based on the total weight of components A) and B), of diisocyanates other than those set forth in A) with C) diols containing ester groups and/or carbonate groups and having an average molecular weight of 134 to 1200, D) up to 80% by weight, based on the total weight of components C) and D), of diols containing no ester groups and no carbonate groups and having a molecular weight of 62 to 300 and E) up to 40% by weight, based on the total weight of components C), D) and E), of compounds which have monofunctional reactivity towards isocyanate groups.

Finally, the present invention relates to the use of these polyaddition compounds as a starling component for the manufacture of polyurethane plastics, especially as the cross-linking component in thermally cross-linkable two-component polyurethane powder coatings for heat-resistant substrates.

DETAILED DESCRIPTION OF THE INVENTION

Compounds A) are selected from uretdione group-containing polyisocyanates having an average isocyanate functionality of at least 2.0. These polyisocyanates can be obtained in a known manner by the catalytic dimerization of a portion of the isocyanate groups of monomeric diisocyanates preferably followed by separation of the unreacted excess diisocyanate, for example by thin-layer distillation. Suitable for the preparation of compounds A) are diisocyanates having aliphatically, cycloaliphatically, araliphatically and/or aromatically bound isocyanate groups and a molecular weight of 140 to 400. Examples include 1,4-diisocyanatobutane, 1,6-diisocyanatohexane. 1,5-diisocyanato-2,2-dimethylpentane. 2,2,4- and 2,4,4-trimethyl-1,6-diisocyanatohexane, 1,10-diisocyanatodecane. 1,3-and 1,4-diisocyanato-cyclohexane, 1,3-diisocyanato-2(4)-methylcydohexane, 1-isocyanato-3,3,5-trimethyl-5-isocyanatomethylcydohexane (isophorone diisocyanate), 1-isocyanato-1-methyl-4(3)-isocyanatomethylcyclohexane, 4,4'-diisocyanatodicydohexylmethane. 1,3- and 1,4-phenylene diisocyanate, 2,4- and/or 2,6-toluylene diisocyanate, diphenylmethane-2,4'- and/or-4,4'-diisocyanate, naphthylene-1,5-diisocyanate and mixtures thereof.

Suitable catalysts for the preparation of compounds A) are known and include any compounds that catalyze the dimerization of isocyanate groups, such as the tertiary organic phosphines described in U.S. Pat. No. 4,614,785, column 4, lines 11 to 47, or the DE-OS's 1,934,763 and 3,900,053; the tris(dialkylamino)phosphines described in DE-OS's 3,030, 513, 3,227,779 and 3,437,635; the substituted pyridines described in DE-OS's 1,081,895 and 3,739,549; and the substituted imidazoles or benzimidazoles described in EP 417,603.

Preferred compounds A) are uretdione group-containing polyisocyanates prepared from diisocyanates having aliphatically and/or cycloaliphatically bound isocyanate groups or mixtures of these polyisocyanates.

Uretdione group-containing polyisocyanates prepared from 1,6-diisocyanatohexane and/or 1-isocyanato-3,3,5-trimethyl-5-isocyanatomethylcyclohexane are especially preferred.

During the preparation of the uretdione group-containing polyisocyanates by catalytic dimerization, a trimedzation reaction often takes place to a minor extent to produce higher than difunctional polyisocyanates containing isocyanurate groups, such that the average NCO functionality of component A), based on the free NCO groups, is generally from 2.0 to 2.5.

Optional diisocyanates B) are selected from the diisocyanates previously described as suitable for the preparation of compounds A). Diisocyanates B) are used, if at all, in amounts of up to 70% by weight, preferably up to 50% by weight, based on the total weight of components A) and B). Mixtures of starting components A) and B) suitable for the process according to the invention include solutions of uretdione group-containing polyisocyanates in monomeric diisocyanates, such as those obtained in the above-described preparation of compounds A) if the separation of the excess, unreacted diisocyanates is omitted. In this embodiment, the proportion of diisocyanates B) in the total amount of the starting components A) and B) can also be up to 70% by weight. Preferred diisocyanates B) are diisocyanates having cycloaliphatically bonded isocyanate groups. The use of 1-isocyanato-3,3,5-trimethyl-5-isocyanatomethylcyclohexane and/or 4,4'-diisocyanatodicyclohexylmethane is especially preferred.

In the process according to the invention, diols containing ester groups and/or carbonate groups and having an average molecular weight (which can be calculated from the functionality and hydroxyl number) of 134 to 1200, preferably 176 to 800, are used as compounds C).

These diols are selected from the known ester-group-containing diols, which may be prepared, for example, by reacting dihydric alcohols with substoichiometric amounts of dicarboxylic adds, the corresponding dicarboxylic acid anhydrides or the corresponding dicarboxylic acid esters of lower alcohols, or lactones.

Dihydric alcohols suitable for the preparation of those ester diols include those having a molecular weight of 62 to 300, such as 1,2-ethanediol, 1,2- and 1,3-propanediol, the isomers of butanediol, pentanediol, hexanediol, heptanediol and octanediol, 1,2- and 1,4-cydohexanediol, 1,4-cyclohexanedimethanol and 4,4'-(1-methylethylidene)-biscyclohexanol.

The acids or acid derivatives used for the preparation of the ester diols may be aliphatic, cycloaliphatic, aromatic and/or heteroaromatic with regard to the carbon atoms to which the acid groups or their derivatives are attached, and may also be unsaturated and/or substituted, for example by halogen atoms.

Examples of suitable acids are divalent carboxylic acids having a molecular weight of 118 to 300 or their derivatives, such as succinic acid, adipic acid, sebacic acid, phthalic acid, isophthalic acid, phthalic acid anhydride, tetrahydrophthalic acid, maleic acid, maleic acid anhydride, dimeric fatty acids, terephthalic acid dimethyl ester and terephthalic acid bisglycol ester. Mixtures of these compounds may also be used for the preparation of the ester diols.

Preferred ester diols are those prepared in a known manner from lactones and simple dihydric alcohols as starer molecules through a ring opening reaction. Suitable lactones for the preparation of these ester diols include β-propiolactone, γ-butyrolactone, γ- and δ-valerolactone, ε-caprolactone, 3,5,5- and 3,3,5-trimethylcaprolactone or mixtures thereof. Suitable starter molecules include the previously described dihydric alcohols having a molecular weight of 62 to 300 and mixtures thereof. Especially preferred ester diols are those prepared from ε-caprolactone.

Compounds C) also include diols containing carbonate groups. Such diols are known and include those obtained by reacting the previously described dihydric alcohols having a molecular weight of 62 to 300 with diaryl carbonates (such as diphenyl carbonate), phosgene and preferably cyclic carbonates (such as trimethylene carbonate or 2,2-dimethyltrimethylene carbonate (neopentyl glycol carbonate, NPC).

Mixtures may also be used. Especially preferred carbonate diols are those prepared from dihydric alcohols as starter molecules and NPC.

Diols containing both ester groups and carbonate groups are also suitable as compounds C). Such ester-carbonate diols may be prepared in accordance with DE-AS 1,770,245 by reacting the previously described dihydric alcohols with the previously described lactones, preferably ε-caprolactone, and subsequently reacting the resulting ester diols with diphenyl carbonate. However, ester-carbonate diols obtained by reacting dihydric alcohols with mixtures of lactones and cyclic carbonates are preferably used.

The preparation of the ester diols, carbonate diols and ester-carbonate diols by ring-opening polymerization is generally carried out in the presence of catalysts, such as Lewis acids, Brönstedt acids or organic tin or titanium compounds at temperatures of 20° to 200° C., preferably 50° to 160° C.

Any desired mixtures of the ester diols, carbonate diols and ester-carbonate diols previously described may be used in the process according to the invention as component C).

Diols D), which do not contain ester groups or carbonate groups and which have a molecular weight of 62 to 300 may optionally be used in the process according to the invention. Such diols include the previously described dihydric alcohols for the preparation of compounds C), or mixtures of these alcohols. Diols D) are used, if at all, in amounts of up to 80% by weight, preferably up to 60% by weight, based on the total amount of the compounds C) and D). Suitable mixtures of compounds C) and D) may be obtained when only some of the dihydric alcohols are converted with acids, acid derivatives, diaryl carbonates, cyclic carbonates or phosgene into diols containing ester groups and/or carbonate groups.

In the process according to the invention, compounds E) which have monofunctional reactivity towards isocyanate groups may optionally be used. Suitable compounds E) are selected from aliphatic or cycloaliphatic monoamines or monoalcohols having a molecular weight of 31 to 300. Examples include primary monoamines such as methylamine, ethylamine, n-propylamine, isopropylamine, the isomers of butylamine, pentylamine, hexylamine and octylamine, n-dodecylamine, n-tetradecylamine, n-hexadecylamine, n-octadecylamine, cyclohexylamine and the isomers of methylcyclohexylamine and aminomethylcyclohexane; secondary monoamines such as dimethylamine, diethylamine, dipropylamine, diisopropylamine, dibutylamine, diisobutylamine, bis(2-ethylhexyl)amine and N-methyl- or N-ethyl-cyclohexylamine and dicyclohexylamine; and monoalcohols such as methanol, ethanol, n-propanol, isopropanol, n-butanol, isobutanol, sec-butanol, the isomers of pentanol, hexanol, octanol and nonanol, n-decanol, n-dodecanol, n-tetradecanol, n-hexadecanol, n-octadecanol, cyclohexanol and the isomers of methylcyclohexanol and hydroxymethylcyclohexane.

Monofunctional compounds E) are used, if at all, in amounts of up to 40% by weight, preferably up to 25% by weight, based on the total amount of compounds C), D) and E). Preferred compounds E) for the process according to the invention are the previously described aliphatic or cycloaliphatic monoalcohols.

In order to carry out the process according to the invention, the uretdione group-containing polyisocyanates A) and optional diisocyanates B) are reacted with diols C) containing ester groups and/or carbonate groups, optional diols D) containing no ester groups and no carbonate groups and optionally monofunctional compounds E) at an equivalent ratio of isocyanate groups to isocyanate-reactive groups of 0.6:1 to 1.2:1, preferably 0.8:1 to 1.1:1, at a reaction temperature of 40° to 110° C., preferably 60° to 105° C.

When using equivalent or excess amounts of isocyanate groups, the reaction is carried out until the residual NCO content is at most 2.0% by weight, preferably less than 1.2% by weight and more preferably less than 0.9% by weight. When using less than equivalent amounts of isocyanate groups, the reaction is carried until the residual NCO content is less than 0.5% by weight, preferably less than 0.2% by weight more preferably until all of the isocyanate groups have reacted completely. The type and ratios of the starting compounds are chosen such that the resulting polyaddition compounds satisfy the requirement of a) to e).

The content of free isocyanate groups a) in the polyaddition compounds is preferably less than 1.2% by weight, more preferably less than 0.9% by weight. The content of uretdione groups b) is preferably 5 to 15% by weight, more preferably 7 to 14% by weight. The content of urethane groups c) is preferably 11 to 20% by weight, more preferably 12 to 17% by weight. The content of carboxylic acid ester groups d) is preferably 0 to 18% by weight, more preferably 0 to 16% by weight. The content of carbonate groups e) is preferably 0 to 20% by weight, more preferably 0 to 15% by weight. The total content of carboxylic acid esters and carbonate groups is preferably at least 2% by weight, more preferably at least 3% by weight. The polyaddition compounds are solid below 40° C. and liquid above 125° C., and preferably have a melting point or melting range determined by differential thermoanalysis (DTA) within the temperature range of from 40° to 110° C., more preferably 50 to 100° C.

The uretdione group-containing polyaddition products according to the invention are distinguished by very low melt viscosities even at temperatures only slightly above their melting point or melting range. Therefore, they can be prepared in the melt in accordance with the process of the invention at temperatures below the cleaving temperature of uretdione groups.

The reaction may also be carried out in a suitable solvent, which is inert towards isocyanate groups, in a less preferred embodiment. Suitable solvents include known coating solvents such as ethyl acetate, butyl acetate, ethylene glycol monomethyl or monoethyl ether acetate, 1-methoxypropyl-2-acetate, 2-butanone, 4-methyl-2-pentanone, cyclohexanone, toluene, propylene glycol diacetate, diethylene glycol dimethyl ether, diethylene glycol ethyl and butyl ether acetate, N-methylpyrrolidone, N-methylcaprolactam and mixtures thereof.

These solvents must be separated from the products according to the invention when the reaction is complete using suitable methods, for example, by suction-filtering, spray-drying or melt extrusion using an endless evaporation screw.

The catalysts known from polyurethane chemistry may also be used in the process according to the invention to accelerate the reaction. Examples include tertiary amines such as triethylamine, pyridine, methylpyridine, benzyldimethylamine, N,N-endoethylenepiperazine, N-methylpiperidine, pentamethyldiethylenetriamine, N,N-dimethylaminocyclohexane and N,N'-dimethylpiperazine; and metal salts such as iron(Ill) chloride, zinc chloride, zinc 2-ethyl caproate, tin(II) ethyl caproate, dibutyltin(IV) dilaurate and molybdenum glycolate.

These catalysts are optionally used in amounts of 0.001 to 2.0% by weight, preferably 0.01 to 0.2% by weight, based on the total amount of the starting compounds A) to E).

The polyaddition compounds according to the invention are valuable starting materials for the manufacture of polyurethane plastics in accordance with the isocyanate polyaddition process. They are used especially as the cross-linking component in thermosetting PUR powder coatings that do not contain blocking agents.

Suitable reaction partners for the polyaddition compounds according to the invention are known binding agents from powder coating technology that contain isocyanate-reactive groups such as hydroxyl, carboxyl, amino, thiol, urethane or urea groups. However, hydroxy-functional powder coating binding agents, which are solid below 40° C. and liquid above 130° C., are preferably used. The softening temperatures of these hydroxy-functional resins—determined by differential thermo-analysis (DTA)—are preferably 30° to 120° C., more preferably 35° to 110° C. The hydroxyl numbers of these resins are generally 25 to 200, preferably 30 to 130, and their average molecular weight (which may be calculated from the functionality and the hydroxyl content) is generally 400 to 10,000, preferably 1,000 to 5,000.

Such powder coating binding agents include hydroxyl group-containing polyesters, polyacrylates and polyurethanes, such as those described in the previously mentioned publications prior art, for example EP-A-0,045,998 and EP-A-0,254,152. Mixtures of these resins may also be used.

In order to manufacture the powder coating composition, the polyaddition compounds according to the invention are mixed with suitable hydroxy-functional powder coating binding agents. Other additives (such as catalysts, pigments, fillers and flow agents) may optionally be added. The constituents are combined to form a homogeneous material, for example using extruders or kneaders, at a temperature above the melting range of the individual components, for example, at 70° to 130° C., preferably 70° to 110° C. The solid obtained when the melt has cooled is then ground and freed of grains that are of a size above that desired, for example above 0.1 mm, by sieving.

The polyaddition compounds according to the invention and the hydroxy-functional binding agents are used in amounts such that the equivalent ratio of isocyanate groups to hydroxyl groups is 0.6 to 1.4, preferably 0.8 to 1.2. Isocyanate groups in the polyaddition compounds according to the invention are understood as being the total number of isocyanate groups present in dimeric form as uretdione groups and as free isocyanate groups.

The catalysts optionally used to accelerate curing are the known from polyurethane chemistry and include those previously described for accelerating the reaction for preparing the compounds according to the invention. These catalysts may optionally be added in amounts of 0.01 to 5.0% by weight, preferably 0.05 to 1.0% by weight, based on the total amount of organic binding agent, i.e., the polyaddition compounds according to the invention and the hydroxy-functional powder coating binding agents, but excluding the optional additives.

The resulting powder coating ready for spraying can be applied to the substrates to be coated in accordance with customary powder application methods, such as electrostatic powder spraying or whirl sintering. The surface coatings are hardened by heating to temperatures of 110° to 220° C., preferably 130° to 200° C., for a period of approximately 10 to 30 minutes. Hard and resilient coatings that are distinguished by good resistance to solvents and chemicals are obtained.

Due to the low melt viscosity of the uretdione group-containing polyaddition compounds according to the invention, the powder coatings produced therewith exhibit an excellent flow and a very high degree of gloss. Distinctly lower stoving temperatures are required to obtain fully cross-linked coating films than when the corresponding polyaddition compounds of the prior art containing no ester groups and no carbonate groups are used.

According to the invention, any heat-resistant substrates, such as glass or metals, can be coated.

The following examples serve to further illustrate the invention. All parts and percentages, with the exception of the gloss values, are percentages by weight.

EXAMPLES

Preparation of Compounds C

Diol C 1 Containing Ester Groups 901 g of 1,4-butanediol and 2282 g of ε-caprolactone were mixed at room temperature under dry nitrogen. 0.3 g of tin(II) octoate was added and the mixture was then heated at 160° C. for 5 hours. After cooling to room temperature, a colorless liquid product having the following characteristic data was obtained:

| η (23° C.): | 240 mPa · s |
| --- | --- |
| OH number | 342 mg of KOH/g |
| free caprolactone: | 0.3 % |
| average molecular weight (calc. from OH number): | 327 |
| ester group content (calc.): | 27.6 % |

Diol C 2 Containing Ester Groups 901 g of 1,4-butanediol and 1712 g of ε-caprolactone were mixed at room temperature under dry nitrogen. 0.3 g of tin(II) octoate was added and the mixture was then heated at 160° C. for 5 hours. After cooling to room temperature, a colorless liquid product having the following characteristic data was obtained:

| η (23° C.): | 180 mPa · s |
| --- | --- |
| OH number: | 416 mg of KOH/g |
| free caprolactone: | 0.2 % |
| average molecular weight (calc. from OH number): | 269 |
| ester group content (calc.): | 25.3 % |

Diol C 3 Containing Carbonate Groups 901 g of 1,4-butanediol and 2600 g of neopentyl glycol carbonate (NPC) were placed under dry nitrogen at room temperature. 0.4 g of ortho-phosphoric acid was added and then the mixture was heated at 160° C. for 8 hours. After cooling to room temperature, a practically colorless liquid product having the following characteristic data was obtained:

| η (23° C.): | 6500 mPa · s |
| --- | --- |
| OH number | 306 mg of KOH/g |
| free NPC: | 0.8 % |
| average molecular weight (calc. from OH number): | 366 |
| carbonate group content (calc.): | 34.3 % |

Diol C 4 Containing Carbonate Groups 901 g of 1,4-butanediol and 1300 g of NPC were mixed at room temperature under dry nitrogen. 0.2 g of ortho-phosphoric acid was added and the mixture was then heated at 160° C. for 8 hours. After cooling to room temperature, a practically colorless liquid product having the following characteristic data was obtained:

| η (23° C.): | 1500 mPa · s |
| --- | --- |
| OH number: | 519 mg of KOH/g |
| free NPC: | 0.5 % |

-continued

| average molecular weight (calc. from OH number): | 216 |
|---|---|
| carbonate group content (calc.): | 27.3 % |

Diol C 5 Containing Ester Groups 1182 g of 1,6-hexanediol and 1141 g of ε-caprolactone were mixed at room temperature under dry nitrogen. 0.2 g of tin(II) octoate was added and the mixture was then heated at 160° C. for 5 hours. After cooling to room temperature, a colorless liquid product having the following characteristic data was obtained:

| η (23° C.): | 210 mPa · s |
|---|---|
| OH number: | 474 mg of KOH/g |
| free caprolactone: | 0.2 % |
| average molecular weight (calc. from OH number): | 236 |
| ester group content (calc.): | 18.9 % |

Example 1

1000 g (4.3 equivalents) of a uretdione group-containing polyisocyanate based on 1-isocyanato-3,3,5-trimethyl-5-isocyanatomethylcyclohexane (IPDI) and having a content of free isocyanate groups of 17.9%, an average NCO functionality of 2.0 and a content of uretdione groups (determined by hot titration) of 19.1% were heated to 80° C. under dry nitrogen. A mixture of 556 g (3.4 equivalents) of diol C 1 containing ester groups and 117 g (0.9 equivalent) of 2-ethyl-1-hexanol was then added within a period of 30 minutes and the mixture was stirred at a maximum reaction temperature of 100° C. until, after from 7 to 8 hours, the NCO content of the reaction mixture had decreased to 0.8%.

The melt was poured onto a plate of sheet metal to cool and a polyaddition compound according to the invention was obtained in the form of a practically colorless solid resin having the following characteristic data:

| NCO content: | 0.8% |
|---|---|
| uretdione group content (calc.): | 11.9% |
| total NCO content: | 12.7% |
| melting point: | 65–68° C. |
| ester group content (calc.): | 9.2% |
| urethane group content (calc.): | 15.2% |

Example 2 (Comparison)

1000 g (4.3 equivalents) of the uretdione group-containing polyisocyanate of Example 1 were heated to 80° C. under dry nitrogen. A mixture of 153 g (3.4 equivalents) of 1,4-butanediol and 117 g (0.9 equivalent) of 2-ethyl-1-hexanol was then added within a period of 30 minutes. Due to the rapidly increasing viscosity of the reaction mixture, the temperature of the heating bath had to be increased to 110° C. in order to ensure that the mixture could be stirred. After approximately 40 minutes the NCO content of the reaction mixture was 2.8%. After 60 minutes, despite the fact that the external temperature remained constant, the temperature of the reaction mixture had risen from 110° C. to 127° C. because the viscosity continued to increase under the action of the shearing forces occurring during stirring.

The NCO content increased to 4.1% and did not decrease again even after a relatively long reaction period.

The comparison demonstrates that when the uretdione group-containing polyisocyanate of Example 1 was reacted in the melt as described in Example 1 with diols containing no ester groups and no carbonate groups, a high degree of uretdione cleavage and reformation of isocyanate groups occurred.

Example 3 (Comparison)

1000 g (4.3 equivalents) of the uretdione group-containing polyisocyanate of Example 1 were placed in 1270 g of non-aqueous toluene at 80° C. under dry nitrogen. A mixture of 153 g (3.4 equivalents) of 1,4-butanediol and 117 g (0.9 equivalent) of 2-ethyl-1-hexanol was added within a period of 30 minutes and the mixture was stirred at a reaction temperature of 100° C. until the NCO content had decreased to a value of 0.2%. The yellowish solution obtained was then completely freed of solvent by spray-drying in a commercial laboratory spray-dryer, Minispray Dryer 190 (manufactured by Büchi). A pale yellow product having the following characteristic data was obtained:

| NCO content: | 0.3% |
|---|---|
| uretdione group content (calc.): | 15.0% |
| total NCO content: | 15.3% |
| melting point | 105–111° C. |

Example 4

1000 g (4.3 equivalents) of the uretdione group-containing polyisocyanate of Example 1 were heated to 80° C. under dry nitrogen. A mixture of 457 g (3.4 equivalents) of diol C 2 containing ester groups and 117 g (0.9 equivalent) of 2-ethyl-1-hexanol was then added within a period of 30 minutes and the mixture was stirred at a maximum reaction temperature of 105° C. until, after approximately 2 hours, the NCO content of the reaction mixture had decreased to a value of 0.7%.

The melt was poured onto a plate of sheet metal to cool and a polyaddition compound according to the invention was obtained in the form of a practically colorless solid resin having the following characteristic data:

| NCO content: | 0.7% |
|---|---|
| uretdione group content (calc.): | 12.1% |
| total NCO content: | 12.8% |
| melting point: | 82–83° C. |
| ester group content (calc.): | 7.3% |
| urethane group content (calc.): | 16.1% |

Example 5

1000 g (4.3 equivalents) of the uretdione group-containing polyisocyanate of Example 1 were heated to 80° C. under dry nitrogen. A mixture of 622 g (3.4 equivalents) of diol C 3 containing carbonate groups and 117 g (0.9 equivalent) of 2-ethyl-1-hexanol was then added within a period of 30 minutes and the mixture was stirred at a maximum reaction temperature of 110° C. until, after approximately 2 hours, the NCO content of the reaction mixture had decreased to a value of 0.5%.

The melt was poured onto a plate of sheet metal to cool and a polyaddition compound according to the invention was obtained in the form of a practically colorless solid resin having the following characteristic data:

| | |
|---|---|
| NCO content: | 0.5% |
| uretdione group content (calc.): | 11.0% |
| total NCO content: | 11.5% |
| melting point: | 87–89° C. |
| carbonate group content (calc.): | 12.3% |
| urethane group content (calc.): | 14.6% |

Example 6

1000 g (4.3 equivalents) of the uretdione group-containing polyisocyanate of Example 1 were heated to 80° C. under dry nitrogen. A mixture of 229 g (1.7 equivalents) of diol C 2 containing ester groups, 184 g (1.7 equivalents) of diol C 4 containing carbonate groups and 117 g (0.9 equivalent) of 2-ethyl-1-hexanol was then added within a period of 30 minutes and the mixture was stirred at a maximum reaction temperature of 100° C. until, after approximately 3 hours, the NCO content of the reaction mixture had decreased to a value of 0.8%.

The melt was poured onto a plate of sheet metal to cool and a polyaddition compound according to the invention was obtained in the form of a practically colorless solid resin having the following characteristic data:

| | |
|---|---|
| NCO content: | 0.8% |
| uretdione group content (calc.): | 12.5% |
| total NCO content: | 13.3% |
| melting point: | 89–91° C. |
| ester group content (calc.): | 3.8% |
| carbonate group content (calc.): | 3.3% |
| urethane group content (calc.): | 16.6% |

Example 7

1000 g (5.1 equivalents) of a uretdione- and isocyanurate-group-containing polyisocyanate based on 1,6-diisocyanato-hexane (HDI) and having a content of free isocyanate groups of 21.6%, an average NCO functionality of 2.3 and a content of uretdione groups (determined by hot titration) of 15.0% were heated to 80° C. under dry nitrogen. A mixture of 113 g (1.5 equivalents) of n-butanol. 295 g (2.5 equivalents) of diol C 5 containing ester groups and 130 g (1.1 equivalents) of 1,6-hexanediol was then added within a period of 30 minutes and the mixture was stirred at a reaction temperature of max. 104° C. until, after approximately 2 hours, the NCO content of the reaction mixture had decreased to a value of 0.7%.

The melt was poured onto a plate of sheet metal to cool and a polyaddition compound according to the invention was obtained in the form of a colorless solid resin having the following characteristic data:

| | |
|---|---|
| NCO content: | 0.7% |
| uretdione group content (calc.): | 9.8% |
| total NCO content: | 10.5% |
| melting point: | 84–91° C. |
| ester group content (calc.): | 3.6% |
| urethane group content (calc.): | 19.6% |

Example 8 (Use)

76.0 parts by weight of a hydroxyl-group-containing polyester prepared from 66.6 parts by weight of terephthalic acid, 38.2 parts by weight of neopentyl glycol, 5.3 parts by weight of 1,6-hexanediol and 4.5 parts by weight of 1,1,1-trimethylolpropane and having an OH number of 50 and a melting range (determined by differential thermoanalysis) of 55° to 60° C., were mixed thoroughly with 22.5 parts by weight of the polyaddition compound of the invention obtained according to Example 1 (total NCO/OH equivalent ratio=1:1), 1.0 part by weight of a commercial flow agent (Perenol F 30 P, manufactured by Henkel, Düsseldorf) and 0.5 part by weight of tin(II) octoate as catalyst. The mixture was then homogenized using a Buss co-kneader of type PLK 46 at 150 rev/min and at a housing temperature of 40° C. in the feed-in region and at the shaft, and 80° C. in the process part; mass temperatures of 95° to 100° C. were reached. The solidified melt was ground and sieved using a separator mill ACM 2 (manufactured by Hosokawa Mikropul) having a 90-μm sieve. The resulting powder was sprayed using an ESB cup pistol at a high voltage of 70 kV onto a degreased plate of sheet steel and cured for 30 minutes at 160° C. and for 30 minutes at 170° C. to form a smooth transparent coating.

For comparison purposes, a clear powder coating was prepared in an analogous manner from 79.1 parts by weight of the same hydroxyl-group-containing polyester with 19.4 parts by weight of the polyaddition compound obtained in accordance with Comparison Example 3 (total NCO/OH equivalent ratio=1:1), 1.0 part by weight of a commercial flow agent (Perenol F 30 P, manufactured by Henkel, Düsseldorf) and 0.5 part by weight of tin(II) octoate as catalyst. The clear powder coating was sprayed onto a degreased plate of sheet steel as described above and cured for 30 minutes at 160° C. and for 30 minutes at 170° C.

At layer thicknesses of approximately 60 μm, the following coating properties were found: Powder coating with polyaddition compound from

| | Example 1 | | Comparison Example 3 | |
|---|---|---|---|---|
| | 30' 160° C. | 30' 170° C. | 30' 160° C. | 30' 170° C. |
| CI[a] | >9 | >9 | 0.6 | >9 |
| gloss[b] | | | | |
| 20° | 87 | 88 | 60 | 64 |
| 60° | 104 | 105 | 100 | 100 |
| Ac[c] | | | | |
| DR | 50 | 50 | 50 | 50 |
| rating | 2 | 2 | 2 m | 2 m |

[a] CI = cupping index according to DIN 53156
[b] gloss = gloss according to Gardner; 20° and 60° angle of reflection
[c] AC = acetone test; DR = number of double rubs with saturated cotton wool pad
rating =
0 = film intact
1 = film surface softened
2 = film swollen as far as base
m = mat (loss of gloss)

The comparison demonstrates that, by using the polyaddition compound according to the invention, a fully cross-linked resilient coating was obtained, even at a relatively low stoving temperature. The coating was also distinguished by an improved flow and a higher degree of gloss.

Examples 9–12

White coatings having the following composition (parts by weight) were prepared according to the process described in Example 8 (total NCO/OH equivalent ratio=1:1) from the hydroxyl group-containing polyester described in Example 8, a commercial flow agent (Acronal F 4, manufactured by BASF), white pigment R-KB 4 (TiO$_2$), and the polyaddition compounds according to Examples 4, 5 and 6 and Comparison Example 3:

| Example | 9 | 10 | 11 | 12 (comparison) |
|---|---|---|---|---|
| polyester of Example 8 | 46.3 | 45.2 | 46.7 | 47.7 |
| polyaddition compound of | | | | |
| Example 4 | 13.1 | — | — | — |
| Example 5 | — | 14.2 | — | — |
| Example 6 | — | — | 12.7 | — |
| Comparison Example 3 | — | — | — | 11.7 |
| flow agent | 0.6 | 0.6 | 0.6 | 0.6 |
| TiO$_2$ | 40.0 | 40.0 | 40.0 | 40.0 |
| | 100.0 | 100.0 | 100.0 | 100.0 |

The powders were sprayed using an ESB cup pistol at a high voltage of 70 kV onto degreased plates of sheet steel and cured for 30 minutes at 170° C. in each case. At layer thicknesses of 60±5 μm, the following coating properties were found:

| | Example 9 | Example 10 | Example 11 | Example 12 (Comparison) |
|---|---|---|---|---|
| Cl$^{a)}$ gloss$^{b)}$ | >9 | >9 | >9 | 4.6 |
| 20° | 73 | 72 | 76 | 47 |
| 60° Ac$^{c)}$ | 90 | 90 | 91 | 82 |
| DR rating | 50 2 m | 50 2 m | 50 2 m | 50 2 m |

$^{a)}$, $^{b)}$, $^{c)}$: see footnote to Example 8

When the polyaddition compounds according to the invention were used, coatings were obtained that were distinguished by greater resilience and gloss values compared to the comparison example.

Example 13

In accordance with the method described in Example 8 a clear powder coating composition was prepared from 81.9 parts by weight of a hydroxyl group-containing polyacrylate prepared from 37.0 parts by weight of methyl methacrylate, 24.0 parts by weight of n-butyl methacrylate, 18.9 parts by weight of styrene, 19.1 parts by weight of 2-hydroxyethyl methacrylate and 1.0 part by weight of acrylic acid and having an OH number of 70 and a melting range (determined by differential thermoanalysis) of 62° to 66° C., 37.1 parts by weight of the polyaddition compound according to the invention obtained in accordance with Example 7 (total NCO/OH equivalent ratio=1.2:1 ) and 1.0 part by weight of a commercial flow agent (Perenol F 30 P, manufactured by Henkel, Düsseldorf). The coating composition was sprayed onto a degreased plate of sheet steel and stoved for 30 minutes at 150° C., for 30 minutes at 160° C. and for 30 minutes at 170° C. to form a smooth transparent coating.

At a layer thickness of approximately 60 μm, the following coating properties were found:

| | 30' 150° C. | 30' 160° C. | 30' 170° C. |
|---|---|---|---|
| Cl$^{a)}$ gloss$^{b)}$ | >9 | >9 | >9 |
| 20° | 82 | 84 | 82 |
| 60° Ac$^{c)}$ | 97 | 98 | 97 |
| DR rating | 50 2 m | 50 2 | 50 1 |

$^{a)}$, $^{b)}$, $^{c)}$: see footnote to Example 8

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A powder coating composition which comprises
   I) a polyaddition compound that is solid below 40° C. and liquid above 125° C., based on diisocyanates having aliphatically and/or cycloaliphatically bound isocyanate groups and contains, based on the weight of the polyaddition compound,
      a) 0 to 2% by weight of free isocyanate groups (calculated as NCO; molecular weight =42),
      b) 7 to 14% by weight of uretdione groups (calculated as C$_2$N$_2$O$_2$; molecular weight=84),
      c) 10 to 22% by weight of urethane groups (calculated as —NH—CO—O; molecular weight =59),
      d) 0 to 20% by weight of carboxylic acid ester groups (calculated as —CO—O—; molecular weight =44) and
      e) of 0 to 25% by weight of carbonate groups (calculated as —O—CO—O—; molecular weight=60),
   provided that the total content of carboxylic acid ester groups and carbonate groups is at least 1% by weight and
   II) a hydroxy-functional resin,
   wherein components I and II are present at an equivalent ratio of isocyanate groups to hydroxyl groups of 0.8:1 to 1.2:1.

2. The powder coating composition of claim 1 which contains at least 3% by weight of carboxylic acid ester groups and carbonate groups.

* * * * *